United States Patent
Kou et al.

(10) Patent No.: US 12,516,202 B2
(45) Date of Patent: Jan. 6, 2026

(54) AMINE DISPERSANTS

(71) Applicant: BASF SE, Ludwigshafen am Rhein (DE)

(72) Inventors: Huiguang Kou, Ludwigshafen am Rhein (DE); Steffen Onclin, Ludwigshafen am Rhein (DE); Andreas Gernandt, Ludwigshafen am Rhein (DE); Johannes Hermann Willenbacher, Ludwigshafen am Rhein (DE); Clemens Auschra, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 977 days.

(21) Appl. No.: 17/604,131

(22) PCT Filed: Apr. 15, 2020

(86) PCT No.: PCT/EP2020/060569
§ 371 (c)(1),
(2) Date: Oct. 15, 2021

(87) PCT Pub. No.: WO2020/212410
PCT Pub. Date: Oct. 22, 2020

(65) Prior Publication Data
US 2022/0220324 A1 Jul. 14, 2022

(30) Foreign Application Priority Data

Apr. 18, 2019 (EP) .................................... 19170000

(51) Int. Cl.
| | | |
|---|---|---|
| *C09D 7/65* | (2018.01) |
| *C08G 63/08* | (2006.01) |
| *C08G 63/685* | (2006.01) |
| *C09D 11/326* | (2014.01) |
| *C09K 23/16* | (2022.01) |
| *C09K 23/42* | (2022.01) |

(52) U.S. Cl.
CPC ............... *C09D 7/65* (2018.01); *C08G 63/08* (2013.01); *C08G 63/685* (2013.01); *C09D 11/326* (2013.01); *C09K 23/16* (2022.01); *C09K 23/42* (2022.01); *C08G 2150/00* (2013.01)

(58) Field of Classification Search
CPC ........ C09D 7/65; C09D 11/326; C09K 23/42; C09K 23/16; C08G 63/08; C08G 63/685; C08G 2150/00
USPC ......................................................... 524/606
See application file for complete search history.

(56) References Cited

U.S. PATENT DOCUMENTS

| | | | | |
|---|---|---|---|---|
| 3,996,059 A * | 12/1976 | Stansfield | ................ | C09D 7/45 |
| | | | | 106/505 |
| 5,753,022 A * | 5/1998 | Schofield | ............ | C09B 67/0035 |
| | | | | 106/31.77 |
| 2014/0114019 A1* | 4/2014 | Thetford | ................ | C09K 23/18 |
| | | | | 524/606 |

FOREIGN PATENT DOCUMENTS

| | | | | |
|---|---|---|---|---|
| WO | WO-9302131 A1 * | 2/1993 | ............ | B01F 17/005 |
| WO | 99/55763 A1 | 11/1999 | | |

OTHER PUBLICATIONS

International Search Report and Written Opinion received for PCT Patent Application No. PCT/EP2020/060569, mailed on May 26, 2020, 17 pages.

\* cited by examiner

*Primary Examiner* — Kelechi C Egwim
(74) *Attorney, Agent, or Firm* — Faegre Drinker Biddle & Reath LLP

(57) ABSTRACT

The presently claimed invention relates to a dispersant containing oxyalkylenecarbonyl units and a process for its preparation. The presently claimed invention is also directed to the use of the dispersant in a coating composition or an ink composition.

14 Claims, No Drawings

AMINE DISPERSANTS

CROSS-REFERENCE TO RELATED APPLICATIONS

This application is a national stage application (under 35 U.S.C. § 371) of PCT/EP2020/060569, filed Apr. 15, 2020, which claims benefit of European Application No. 19170000.4, filed Apr. 18, 2019, both of which are incorporated herein by reference in their entirety.

FIELD OF THE INVENTION

The presently claimed invention relates to a dispersant containing oxyalkylenecarbonyl units and a process for its preparation. The presently claimed invention is also directed to the use of the dispersant in a coating composition or an ink composition.

BACKGROUND OF THE INVENTION

Dispersions containing fine particulate solid materials such as pigments are widely used, e.g. as coating compositions, as printing inks, for preparing paint systems such as automotive, industrial and decorative paints, for coloring materials such as plastics and glasses and for manufacturing cosmetic compositions.

A dispersant is an important component of dispersions containing fine particulate solid materials. The preparation of dispersions involves incorporation of the solid materials such as pigments into the vehicle by replacing the pigment-air interfaces with pigment-vehicle interfaces. A dispersant facilitates dispersion of pigments in the vehicle as a result of the surface activity at the pigment-vehicle interface. Even though certain organic vehicles have good particle wetting properties, dispersants are used to ensure thorough dispersion of the fine particulate solid materials throughout the vehicle. Dispersants also have a bearing on various process parameters such as dispersion time and energy requirement. An ideal dispersion consists of a homogenous and stable suspension of solid materials after size reduction or milling of any aggregates and agglomerates.

A dispersant improves various dispersion properties such as mill base viscosity and rheology behavior. The enhanced rheology behaviour is characterized by suitable viscosities over a wide range of shear rates. An improvement in viscosity and rheology behaviour leads to improved application properties such as better flowability and levelling, less spattering and sagging of the coating.

The dispersant is also a determining factor of the aesthetics and physical properties of a coating. A dispersant can act as a flow control agent and bring about improved spreading of the composition over the surface of the substrate and improve the flow of the polymer film which forms in the course of curing, resulting in a smooth surface. As a consequence, the dispersant reduces the formation of defects, known as craters, which are caused by impurities acting from the outside or by impurities on the surface of the substrate.

In view of the wide application of dispersions containing fine particulate solid materials and the important role played by the dispersants in their preparation, stability and properties, there is a growing need for improved dispersants that are capable of assisting the preparation of dispersions having the desired characteristics.

Accordingly, it is an object of the presently claimed invention to provide a dispersant that provides a stable dispersion containing fine particulate solid materials having improved dispersion properties such as low viscosity and provides a surface coating with a high gloss and low crater number.

SUMMARY OF THE INVENTION

Surprisingly, it was found that dispersants containing oxyalkylenecarbonyl units and nitrogen containing groups have beneficial properties and that dispersions containing fine particulate solid materials comprising the dispersant containing oxyalkylenecarbonyl units and nitrogen containing groups are stable and have improved properties such as low viscosity and provide a surface coating with a high gloss and low crater number.

Accordingly, the main aspect of the presently claimed invention is directed to a dispersant of formula (I), $$T-(A)_m-L-Z \qquad \text{formula (I)},$$

wherein T is hydrogen or $R^1$—C(=O)—,
$R^1$ is a substituted or unsubstituted, linear or branched $C_1$-$C_{24}$ alkyl;
A is, identical or different, an oxyalkylenecarbonyl unit of formula —O—$R^2$—C(=O)—,
$R^2$ is a substituted or unsubstituted, linear or branched $C_2$-$C_{12}$ alkylene;
m is an integer in the range from 3 to 50;
L represents a group selected from the group consisting of —O— and —NH—;
Z is a nitrogen containing group selected from the group consisting of $Z_1$, $Z_2$, and $Z_3$; wherein $Z_1$ is $R^{11}R^{12}N$—$R^{13}$—, $Z_2$ is Y—$R^{14}$—, and $Z_3$ is Y—$CH_2$—$CH_2$—C(=O)—$OR^{14}$—
$R^{11}$ and $R^{12}$ are independently selected from hydrogen and substituted or unsubstituted, linear or branched $C_1$-$C_{12}$ alkyl which can be the same or different, or $R^{11}$ and $R^{12}$ together with the nitrogen to which they are attached form a 3- to 12-membered ring comprising 0 to 3 heteroatoms,
$R^{13}$ is a substituted or unsubstituted, linear or branched $C_1$-$C_{12}$ alkylene;
Y is a 5- or 6-membered N-containing heterocycle which comprises 1 or 2 nitrogen atoms and which can additionally comprise an oxygen atom,
$R^{14}$ is a substituted or unsubstituted, linear or branched $C_1$-$C_{12}$ alkylene;
or Z is a quaternary ammonium salt derivable from the nitrogen containing group selected from the group consisting of $Z_1$, $Z_2$, and $Z_3$; wherein the quaternary nitrogen is attached to $R^{15}$ and an anion $X^-$,
$R^{15}$ is selected from the group consisting of hydrogen, a substituted or unsubstituted, linear or branched $C_1$-$C_{24}$ alkyl, a substituted or unsubstituted $C_4$-$C_{10}$ cycloalkyl, a substituted or unsubstituted $C_6$-$C_{18}$ aryl, and substituted or unsubstituted, branched or unbranched $C_7$-$C_{18}$ arylalkyl; wherein the $C_1$-$C_{24}$ alkyl is optionally interrupted by —O— and/or is optionally substituted by a group selected from —OH and —O—$C_1$-$C_{10}$alkyl; and
$X^-$ is selected from the group consisting of Cl, Br, I, acetate and benzoate.

In another aspect, the presently claimed invention provides a process for preparing a dispersant of formula (I). The process comprises the following steps.
i. A compound of formula $R^{11}R^{12}N$—$R^{13}$—$NH_2$ is mixed with a lactone monomer of formula (II),

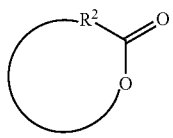

formula (II)

or a polyester homopolymer or copolymer obtainable from the lactone monomer of formula (II) to obtain a reaction mixture, wherein $R^2$, $R^{11}$, $R^{12}$ and $R^{13}$ are as defined above.
  ii. The reaction mixture as obtained in step i. is heated at a temperature in the range of 70 to 150° C. to obtain a homogeneous mixture.
  iii. The homogeneous mixture as obtained in step ii. is heated at a temperature in the range of 100 to 300° C. to obtain the dispersant of formula (I).

In yet another aspect, the presently claimed invention provides the use of the dispersant of formula (I) as a component of a coating composition or an ink composition.

DETAILED DESCRIPTION

Before the present compositions and formulations of the presently claimed invention are described, it is to be understood that this invention is not limited to particular compositions and formulations described, since such compositions and formulation may, of course, vary. It is also to be understood that the terminology used herein is not intended to be limiting, since the scope of the presently claimed invention will be limited only by the appended claims.

If hereinafter a group is defined to comprise at least a certain number of embodiments, this is meant to also encompass a group which preferably consists of these embodiments only. Furthermore, the terms 'first', 'second', 'third' or 'a', 'b', 'c', etc. and the like in the description and in the claims, are used for distinguishing between similar elements and not necessarily for describing a sequential or chronological order. It is to be understood that the terms so used are interchangeable under appropriate circumstances and that the embodiments of the presently claimed invention described herein are capable of operation in other sequences than described or illustrated herein. In case the terms 'first', 'second', 'third' or '(A)', '(B)' and '(C)' or '(a)', '(b)', '(c)', '(d)', 'i', 'ii' etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

Furthermore, the ranges defined throughout the specification include the end values as well, i.e. a range of 1 to 10 implies that both 1 and 10 are included in the range. For the avoidance of doubt, applicant shall be entitled to any equivalents according to applicable law.

In the following passages, different aspects of the presently claimed invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to 'one embodiment' or 'an embodiment' means that a particular feature, structure or characteristic described in connection with the embodiment is included in at least one embodiment of the presently claimed invention. Thus, appearances of the phrases 'in one embodiment' or 'in an embodiment' in various places throughout this specification are not necessarily all referring to the same embodiment, but may refer to the same embodiment. Further, as used in the following, the terms "preferably", "more preferably", "even more preferably", "most preferably" and "in particular" or similar terms are used in conjunction with optional features, without restricting alternative possibilities. Thus, features introduced by these terms are optional features and are not intended to restrict the scope of the claims in any way.

Furthermore, the particular features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the presently claimed invention, and form different embodiments, as would be understood by those in the art. For example, in the appended claims, any of the claimed embodiments can be used in any combination.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Surprisingly, it has been found that the dispersants of the presently claimed invention have high pigment affinity and that they provide dispersions containing fine particulate solid materials that are stable and have improved properties such as low viscosity and provide surface coating with a high gloss.

The dispersants of the presently claimed invention effectively deflocculated the fine particulate solid materials even at high solid content. Moreover, the dispersants enhance the rheology behavior of dispersions, which is normally difficult to achieve at high solids content. Further, their rheology behavior does not change with time.

During application, the dispersants of the presently claimed invention provide dispersions with improved application properties such as better flowability and levelling, less spattering and sagging of the coating, and thereby increasing the gloss of the coating film and decreasing the crater number.

Accordingly, the main aspect of the presently claimed invention is a dispersant of formula (I),

wherein T is hydrogen or $R^1$—C(=O)—,
$R^1$ is a substituted or unsubstituted, linear or branched $C_1$-$C_{24}$ alkyl;
A is, identical or different, an oxyalkylenecarbonyl unit of formula —O—$R^2$—C(=O)—,
$R^2$ is a substituted or unsubstituted, linear or branched $C_2$-$C_{12}$ alkylene;
m is an integer in the range from 3 to 50;
L represents a group selected from the group consisting of —O— and —NH—;

Z is a nitrogen containing group selected from the group consisting of $Z_1$, $Z_2$, and $Z_3$; wherein $Z_1$ is $R^{11}R^{12}N-R^{13}-$, $Z_2$ is $Y-R^{14}-$, and $Z_3$ is $Y-CH_2-CH_2-C(=O)-OR^{14}-$ $R^{11}$ and $R^{12}$ are independently selected from hydrogen and substituted or unsubstituted, linear or branched $C_1-C_{12}$ alkyl which can be the same or different, or $R^{11}$ and $R^{12}$ together with the nitrogen to which they are attached form a 3- to 12-membered ring comprising 0 to 3 heteroatoms, $R^{13}$ is a substituted or unsubstituted, linear or branched $C_1-C_{12}$ alkylene;

Y is a 5- or 6-membered N-containing heterocycle which comprises 1 or 2 nitrogen atoms and which can additionally comprise an oxygen atom, $R^{14}$ is a substituted or unsubstituted, linear or branched $C_1-C_{12}$ alkylene;

or Z is a quaternary ammonium salt derivable from the nitrogen containing group selected from the group consisting of $Z_1$, $Z_2$, and $Z_3$; wherein the quaternary nitrogen is attached to $R^{15}$ and an anion $X^-$, $R^{15}$ is selected from the group consisting of hydrogen, a substituted or unsubstituted, linear or branched $C_1-C_{24}$ alkyl, a substituted or unsubstituted $C_4-C_{10}$ cycloalkyl, a substituted or unsubstituted $C_6-C_{18}$ aryl, and substituted or unsubstituted, branched or unbranched $C_7-C_{18}$ arylalkyl; wherein the $C_1-C_{24}$ alkyl is optionally interrupted by $-O-$ and/or is optionally substituted by a group selected from $-OH$ and $-O-C_1-C_{10}$alkyl; and $X^-$ is selected from the group consisting of Cl, Br, I, acetate and benzoate.

Within the context of the presently claimed invention, the term "alkyl", as used herein, refers to an acylic saturated aliphatic group, including linear or branched alkyl saturated hydrocarbon radicals, denoted by a general formula $C_nH_{2n+1}$ and wherein n is the number of carbon atoms such as 1, 2, 3, 4, etc. The $C_1-C_{24}$ alkyl is optionally interrupted by $-O-$. In connection with "alkyl", the term "substituted" within the scope of this invention is understood as meaning the substitution of hydrogen by 1, 2, 3, 4 or 5 substituents selected from the group consisting of F, Cl, Br, I, CN, OH, $NH_2$, $NH-C_{1-6}$-alkyl, $NH-C_{1-6}$-alkylene-OH, $N(C_{1-6}$-alkyl$)_2$, $N(C_{1-6}$-alkylene-OH$)_2$, $NO_2$, SH, $S-C_{1-6}$-alkyl, S-benzyl, $O-C_{1-10}$-alkyl, $O-C_{1-10}$-alkylene-OH, $=O$, O-benzyl, $C(=O)C_{1-10}$-alkyl, $CO_2H$, $CO_2-C_{10}$-alkyl, phenyl or benzyl. The substitution of hydrogen occurs either on different atoms or on the same atom, for example trisubstituted on the same carbon atom, as in the case of $CF_3$ or $CH_2CF_3$, or at different positions, as in the case of $CH(Cl)-CH=CH-CHCl_2$. Polysubstitution can be carried out with the same or with different substituents, such as, for example, in the case of $CH(OH)-CH=CH-CHCl_2$.

The term "aryl", as used herein, refers to mono- or polycyclic, optionally substituted aromatic radicals having 6 to 20 ring carbon atoms. The term "heteroaryl" refers to "aryl" groups as described above and containing 1, 2, 3, 4, 5 or 6 heteroatoms such as N or O. The term "alkylaryl" refers to alkyl-substituted analogs of the above "aryl" groups. In connection with "aryl", the term "substituted" within the scope of this invention is understood as meaning the substitution of hydrogen by 1, 2, 3, 4 or 5 substituents selected from the group consisting of F, Cl, Br, I, CN, OH, $NH_2$, $NH-C_{1-6}$-alkyl, $NH-C_{1-6}$-alkylene-OH, $N(C_{1-6}$-alkyl$)_2$, $N(C_{1-6}$-alkylene-OH$)_2$, $NO_2$, SH, $S-C_{1-6}$-alkyl, S-benzyl, $O-C_{1-10}$-alkyl, $O-C_{1-10}$-alkylene-OH, $=O$, O-benzyl, $C(=O)C_{1-10}$-alkyl, $CO_2H$, $CO_2-C_{10}$-alkyl, phenyl or benzyl.

In a preferred embodiment, the dispersant of formula (I) is, $$T-(A)_m-L-Z \qquad \text{formula (I)},$$

wherein T is hydrogen or $R^1-C(=O)-$, $R^1$ is a substituted or unsubstituted, linear or branched $C_1-C_{24}$ alkyl;

A is, identical or different, an oxyalkylenecarbonyl unit of formula $-O-R^2-C(=O)-$, $R^2$ is a substituted or unsubstituted, linear or branched $C_2-C_{12}$ alkylene;

m is an integer in the range from 3 to 50;

L represents a group selected from the group consisting of $-O-$ and $-NH-$;

Z is a nitrogen containing group selected from the group consisting of $Z_1$, $Z_2$, and $Z_3$; wherein $Z_1$ is $R^{11}R^{12}N-R^{13}-$, $Z_2$ is $Y-R^{14}-$, and $Z_3$ is $Y-CH_2-CH_2-C(=O)-OR^{14}-$ $R^{11}$ and $R^{12}$ are independently selected from hydrogen and substituted or unsubstituted, linear or branched $C_1-C_{12}$ alkyl which can be the same or different, or $R^{11}$ and $R^{12}$ together with the nitrogen to which they are attached form a 3- to 12-membered ring comprising 0 to 3 heteroatoms, $R^{13}$ is a substituted or unsubstituted, linear or branched $C_1-C_{12}$ alkylene;

Y is a 5- or 6-membered N-containing heterocycle which comprises 1 or 2 nitrogen atoms and which can additionally comprise an oxygen atom, and $R^{14}$ is a substituted or unsubstituted, linear or branched $C_1-C_{12}$ alkylene.

In a preferred embodiment, the dispersant of formula (I) is, $$T-(A)_m-L-Z \qquad \text{formula (I)},$$

wherein T is hydrogen or $R^1-C(=O)-$, $R^1$ is a substituted or unsubstituted, linear or branched $C_1-C_{24}$ alkyl;

A is, identical or different, an oxyalkylenecarbonyl unit of formula $-O-R^2-C(=O)-$, $R^2$ is a substituted or unsubstituted, linear or branched $C_2-C_{12}$ alkylene;

m is an integer in the range from 3 to 50;

L represents a group selected from the group consisting of $-O-$ and $-NH-$;

Z is a quaternary ammonium salt derivable from the nitrogen containing group selected from the group consisting of $Z_1$, $Z_2$, and $Z_3$; and wherein the quaternary nitrogen is attached to $R^{15}$ and an anion $X^-$, wherein $Z_1$ is $R^{11}R^{12}N-R^{13}-$, $Z_2$ is $Y-R^{14}-$, and $Z_3$ is $Y-CH_2-CH_2-C(=O)-OR^{14}-$ $R^{11}$ and $R^{12}$ are independently selected from hydrogen and substituted or unsubstituted, linear or branched $C_1-C_{12}$ alkyl which can be the same or different, or $R^{11}$ and $R^{12}$ together with the nitrogen to which they are attached form a 3- to 12-membered ring comprising 0 to 3 heteroatoms, $R^{13}$ is a substituted or unsubstituted, linear or branched $C_1-C_{12}$ alkylene;

Y is a 5- or 6-membered N-containing heterocycle which comprises 1 or 2 nitrogen atoms and which can additionally comprise an oxygen atom, $R^{14}$ is a substituted or unsubstituted, linear or branched $C_1-C_{12}$ alkylene;

$R^{15}$ is selected from the group consisting of hydrogen, a substituted or unsubstituted, linear or branched $C_1-C_{24}$ alkyl, a substituted or unsubstituted $C_4-C_{10}$ cycloalkyl, a substituted or unsubstituted $C_6$-$C_{18}$ aryl, and substituted or unsubstituted, branched or unbranched $C_7$-$C_{18}$ arylalkyl; wherein the $C_1$-$C_{24}$ alkyl is optionally interrupted by —O— and/or is optionally substituted by a group selected from —OH and —O—$C_1$-$C_{10}$alkyl; and $X^-$ is selected from the group consisting of Cl, Br, I, acetate and benzoate.

In a preferred embodiment, the dispersant of formula (I) is,

$$T\text{-}[O\text{—}R^2\text{—}C(\!=\!O)]_m\text{-}L\text{-}Z \qquad \text{formula (I)},$$

wherein T is hydrogen or $R^1$—C(=O)—, $R^1$ is a substituted or unsubstituted, linear or branched $C_1$-$C_{24}$ alkyl;

$R^2$ is a substituted or unsubstituted, linear or branched $C_2$-$C_{12}$ alkylene;

m is an integer in the range from 3 to 50;

L represents a group selected from the group consisting of —O—, and —NH—;

Z is a nitrogen containing group selected from the group consisting of $Z_1$, $Z_2$, and $Z_3$; wherein $Z_1$ is $R^{11}R^{12}$N—$R^{13}$—, $Z_2$ is Y—$R^{14}$—, and $Z_3$ is Y—CH$_2$—CH$_2$—C(=O)—OR$^{14}$—

$R^{11}$ and $R^{12}$ are independently selected from hydrogen and substituted or unsubstituted, linear or branched $C_1$-$C_{12}$ alkyl which can be the same or different, or $R^{11}$ and $R^{12}$ together with the nitrogen to which they are attached form a 3- to 12-membered ring comprising 0 to 3 heteroatoms, $R^{13}$ is a substituted or unsubstituted, linear or branched $C_1$-$C_{12}$ alkylene;

Y is a 5- or 6-membered N-containing heterocycle which comprises 1 or 2 nitrogen atoms and which can additionally comprise an oxygen atom, $R^{14}$ is a substituted or unsubstituted, linear or branched $C_1$-$C_{12}$ alkylene;

or Z is a quaternary ammonium salt derivable from the nitrogen containing group selected from the group consisting of $Z_1$, $Z_2$, and $Z_3$; wherein the quaternary nitrogen is attached to $R^{15}$ and an anion $X^-$, $R^{15}$ is selected from the group consisting of hydrogen, a substituted or unsubstituted, linear or branched $C_1$-$C_{24}$ alkyl, a substituted or unsubstituted $C_4$-$C_{10}$ cycloalkyl, a substituted or unsubstituted $C_6$-$C_{18}$ aryl, and substituted or unsubstituted, branched or unbranched $C_7$-$C_{18}$ arylalkyl; wherein the $C_1$-$C_{24}$ alkyl is optionally interrupted by —O— and/or is optionally substituted by a group selected from —OH and —O—$C_1$-$C_{10}$alkyl; and $X^-$ is selected from the group consisting of Cl, Br, I, acetate and benzoate.

In a preferred embodiment, the dispersant of formula (I) is,

$$T\text{-}(A^1)_{M1}(A^2)_{M2}\text{-}L\text{-}Z \qquad \text{formula (I)},$$

wherein T is hydrogen or $R^1$—C(=O)—, $R^1$ is a substituted or unsubstituted, linear or branched $C_1$-$C_{24}$ alkyl;

$A^1$ and $A^2$ are different from each other and selected from the group consisting of —O—(CH$_2$)$_5$—C(=O)—, —O—(CH$_2$)$_4$—C(=O)— and —O—(CH$_2$)$_3$—C(=O)—; and M1 and M2 are, identical or different, an integer in the range from 1 to 40, and the ratio of M1 and M2 is in the range from 10:1 to 1:10;

$R^2$ is a substituted or unsubstituted, linear or branched $C_2$-$C_{12}$ alkylene;

m is an integer in the range from 3 to 50;

L represents a group selected from the group consisting of —O—, and —NH—;

Z is a nitrogen containing group selected from the group consisting of $Z_1$, $Z_2$, and $Z_3$; wherein $Z_1$ is $R^{11}R^{12}$N—$R^{13}$—, $Z_2$ is Y—$R^{14}$—, and $Z_3$ is Y—CH$_2$—CH$_2$—C(=O)—OR$^{14}$—

$R^{11}$ and $R^{12}$ are independently selected from hydrogen and substituted or unsubstituted, linear or branched $C_1$-$C_{12}$ alkyl which can be the same or different, or $R^{11}$ and $R^{12}$ together with the nitrogen to which they are attached form a 3- to 12-membered ring comprising 0 to 3 heteroatoms, $R^{13}$ is a substituted or unsubstituted, linear or branched $C_1$-$C_{12}$ alkylene;

Y is a 5- or 6-membered N-containing heterocycle which comprises 1 or 2 nitrogen atoms and which can additionally comprise an oxygen atom, $R^{14}$ is a substituted or unsubstituted, linear or branched $C_1$-$C_{12}$ alkylene;

or Z is a quaternary ammonium salt derivable from the nitrogen containing group selected from the group consisting of $Z_1$, $Z_2$, and $Z_3$; wherein the quaternary nitrogen is attached to $R^{15}$ and an anion $X^-$, $R^{15}$ is selected from the group consisting of hydrogen, a substituted or unsubstituted, linear or branched $C_1$-$C_{24}$ alkyl, a substituted or unsubstituted $C_4$-$C_{10}$ cycloalkyl, a substituted or unsubstituted $C_6$-$C_{18}$ aryl, and substituted or unsubstituted, branched or unbranched $C_7$-$C_{18}$ arylalkyl; wherein the $C_1$-$C_{24}$ alkyl is optionally interrupted by —O— and/or is optionally substituted by a group selected from —OH and —O—$C_1$-$C_{10}$alkyl; and $X^-$ is selected from the group consisting of Cl, Br, I, acetate and benzoate.

In a preferred embodiment, $R^1$ selected from the group consisting of CH$_3$(CH$_2$)$_3$—, CH$_3$(CH$_2$)$_{10}$—, and CH$_3$(CH$_2$)$_{16}$—.

In a more preferred embodiment, T is hydrogen.

In another more preferred embodiment, T is CH$_3$(CH$_2$)$_{10}$—C(=O)—.

In a preferred embodiment, m is an integer in the range from 3 to 20; more preferably in the range from 5 to 15; and most preferably in the range from 5 to 10.

In a particularly preferred embodiment, m is 5. In another particularly preferred embodiment, m is 10.

In a preferred embodiment, $R^2$ is —(CH$_2$)$_5$—, —(CH$_2$)$_4$— or —(CH$_2$)$_3$—.

In a preferred embodiment, $(A)_m$ is $(A^1)_{M1}(A^2)_{M2}$, wherein $A^1$ and $A^2$ are different from each other and selected from the group consisting of —O—(CH$_2$)$_5$—C(=O)—, —O—(CH$_2$)$_4$—C(=O)— and —O—(CH$_2$)$_3$—C(=O)—; and M1 and M2 are, identical or different, an integer in the range from 1 to 40, and the ratio of M1 and M2 is in the range from 10:1 to 1:10.

In a more preferred embodiment, the ratio of M1 and M2 is in the range from 5:1 to 1:5; most preferably in the range from 2:1 to 1:2.

In a preferred embodiment, $(A)_m$ is (—O—(CH$_2$)$_5$—C(=O)—)$_{M1}$(—O—(CH$_2$)$_4$—C(=O)—)$_{M2}$, wherein M1 and M2 are, identical or different, an integer in the range from 1 to 40, and the ratio of M1 and M2 is in the range from 10:1 to 1:10; more preferably in the range from 5:1 to 1:5; most preferably in the range from 2:1 to 1:2.

In a particularly preferred embodiment, $(A)_m$ is (—O—(CH$_2$)$_5$—C(=O)—)$_{M1}$(—O—(CH$_2$)$_4$—C(=O)—)$_{M2}$, wherein M1 and M2 are, identical or different, an integer in the range from 1 to 40, and the ratio of M1 and M2 is 5:3.

In a preferred embodiment, $R^{11}$ and $R^{12}$ are unsubstituted, linear or branched $C_1$-$C_8$ alkyl, and $R^{13}$ is unsubstituted, linear or branched $C_1$-$C_8$ alkylene.

In a more preferred embodiment, $R^{11}$ and $R^{12}$ are unsubstituted, linear or branched $C_1$-$C_4$ alkyl, and $R^{13}$ is unsubstituted, linear or branched $C_1$-$C_4$ alkylene.

In a most preferred embodiment, $R^{11}$ is methyl, $R^{12}$ is methyl and $R^{13}$ is —$CH_2CH_2CH_2$—.

In a preferred embodiment, Y is selected from the group consisting of imidazolyl, morpholinyl and piperidinyl.

In a particularly preferred embodiment, Y is imidazolyl. In another particularly preferred embodiment, Y is piperidinyl.

In a preferred embodiment, $R^{14}$ is selected from the group consisting of —$CH_2$—, —$CH_2CH_2$—, —$CH_2CH_2CH_2$— and —$CH_2CH_2CH_2CH_2$—.

In a preferred embodiment, Z is a quaternary ammonium salt derivable from the nitrogen containing group selected from the group consisting of $Z_1$, $Z_2$, and $Z_3$; wherein the quaternary nitrogen is attached to $R^{15}$ and an anion $X^-$.

In a more preferred embodiment, the dispersant comprising quaternary ammonium salt is derivable from the nitrogen containing basic compound selected from the group consisting of

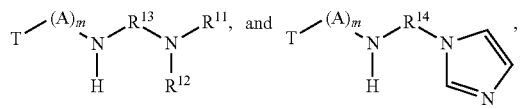

wherein T, $(A)_m$, $R^{11}$, $R^{12}$, $R^{13}$ and $R^{14}$ are as defined above.

In a more preferred embodiment, the dispersant comprising quaternary ammonium salt is selected from the

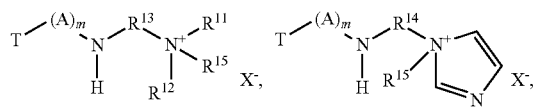

wherein T, $(A)_m$, $R^{11}$, $R^{12}$, $R^{13}$, $R^{14}$, $R^{15}$, and X are as defined above.

In a preferred embodiment, $R^{15}$ is selected from the group consisting of —$CH_2CH(OH)CH_2$—O—$CH_2CH(C_2H_5)$ $CH_2CH_2CH_2CH_3$, —$CH_2$-phenyl and —$CH_2CH_2CH_2$-phenyl, wherein phenyl is unsubstituted or substituted by 1, 2 or 3 substituents selected from the group consisting of chloride, bromide, hydroxy, $NO_2$ and methoxy.

In a particularly preferred embodiment, $R^{15}$ is 2-chlorobenzyl. In another particularly preferred embodiment, $R^{15}$ is 3-phenylpropyl.

In a preferred embodiment, $X^-$ is selected from the group consisting of Cl, Br, I, acetate and benzoate.

In a particularly preferred embodiment, $X^-$ is chloride. In another particularly preferred embodiment, $X^-$ is bromide. In yet another particularly preferred embodiment, $X^-$ is benzoate.

In a preferred embodiment, Z is a nitrogen containing group selected from the group consisting of $Z_1$, $Z_2$, and $Z_3$ and the dispersant has an amine number from 10 to 200 mg KOH/g; more preferably in the range of 20 to 150 mg KOH/g; and most preferably in the range of 30 to 100 mg KOH/g, as determined according to DIN 53176:2002-11.

In a preferred embodiment, Z is a quaternary ammonium salt and the dispersant has an amine number from 1 to 20 mg KOH/g; and more preferably in the range of 2 to 12 mg KOH/g, as determined according to DIN 53176:2002-11.

Another aspect of the presently claimed invention is directed to a process for preparing a dispersant of formula (I). The process comprises the following steps.

i. A compound of formula $R^{11}R^{12}N$—$R^{13}$—$NH_2$ is mixed with a lactone monomer of formula (II),

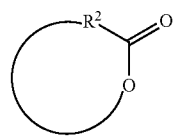

formula (II)

or a polyester homopolymer or copolymer obtainable from the lactone monomer of formula (II) to obtain a reaction mixture, wherein $R^2$, $R^{11}$, $R^{12}$ and $R^{13}$ are as defined above.

ii. The reaction mixture as obtained in step i. is heated at a temperature in the range of 70 to 150° C. to obtain a homogeneous mixture.

iii. The homogeneous mixture as obtained in step ii. is heated at a temperature in the range of 100 to 300° C. to obtain the dispersant of formula (I).

In a preferred embodiment, the lactone monomer of formula (II) is selected from the group consisting of ε-caprolactone, γ-valerolactone, γ-butyrolactone, wherein the lactone monomer is unsubstituted or substituted by 1, 2 or 3 substituents selected from the group consisting of methyl, hydroxy and methoxy.

In a preferred embodiment, the compound of formula $R^{11}R^{12}N$—$R^{13}$—$NH_2$ is selected from the group consisting of 3-(dimethylamino)-1-propylamine, 1-(3-aminopropyl) imidazole, N-(2-aminoethyl)morpholine, N-(2-aminoethyl)-piperidine, and 4-aminomethyl-piperidine.

Another aspect of the presently claimed invention is directed to a process for preparing the dispersant of formula (I). The process comprises the following steps.

a. A hydroxyalkyl acrylate of formula $CH_2$=CH—C(=O)—O—$R^{14}$—OH is heated with a 5- or 6-membered N-containing heterocycle of formula YH at a temperature in the range of 30 to 100° C. to obtain a resultant mixture, wherein Y and $R^{14}$ are defined as defined above.

b. The lactone monomer of formula (II)

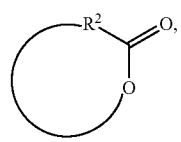

formula (II)

wherein $R^2$ is as defined above, or a polyester homopolymer or copolymer obtainable from the lactone monomer of formula (II) is added to the resultant mixture as obtained in step a. to obtain a reaction mixture, wherein Y, $R^2$ and $R^{14}$ are defined as defined above.

c. The reaction mixture as obtained in step b. is heated at a temperature in the range of 70 to 150° C. to obtain a homogeneous mixture.

d. The homogeneous mixture as obtained in step c. is heated at a temperature in the range of 100 to 300° C. to obtain the dispersant of formula (I).

In a preferred embodiment, the N-containing heterocycle of formula YH is selected from the group consisting of imidazole, morpholine and piperidine.

In a preferred embodiment, the polyester homopolymer or copolymer is obtained by heating a mixture comprising a carboxylic acid of formula $R^1$—C(=O)—OH, wherein $R^1$ is defined as above, and the lactone monomer of formula (II) in the presence of a catalyst at a temperature in the range of 50 to 150° C.

In a preferred embodiment, $R^1$—C(=O—)OH is lauric acid, and the catalyst is dibutyltin dilaurate.

In a preferred embodiment, the process further comprises a step of quaternizing the dispersant obtained in step (iii) or step (d) by heating a mixture comprising the dispersant and an alkylating agent at a temperature in the range of 50 to 150° C.

In a preferred embodiment, the alkylating agent is selected from the group consisting of an alkyl halide of formula $R^{15}X$ and an epoxide of formula (III),

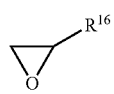

formula (III)

wherein $R^{15}$ is as defined above and $R^{16}$ is a hydrogen or a substituted or unsubstituted, linear or branched $C_1$-$C_{24}$ alkyl, a substituted or unsubstituted $C_4$-$C_{10}$ cycloalkyl, a substituted or unsubstituted $C_6$-$C_{18}$ aryl, and substituted or unsubstituted, branched or unbranched $C_7$-$C_{16}$ arylalkyl; wherein the $C_1$-$C_{24}$ alkyl is optionally interrupted by —O— and/or is optionally substituted by a group selected from —OH and —O—$C_1$-$C_{10}$alkyl.

In a preferred embodiment, the alkyl halide of formula $R^{15}$—X is selected from the group consisting of 2-chlorobenzylchloride, and 1-bromo-3-phenylpropane.

In a preferred embodiment, the epoxide of formula (III) is selected from the group consisting of 2-ethylhexyl glycidyl ether, dodecyl glycidyl ether, tetradecyl glycidyl ether and 1,2-epoxydodecan.

Yet another aspect of the presently claimed invention is directed to a liquid composition in the form of a dispersion comprising the dispersant of the presently claimed invention, a particulate solid material selected from the group consisting of pigments and fillers, and a liquid diluent.

Still another aspect of the presently claimed invention is directed to use of the dispersant as described above as a component of a coating composition or an ink composition.

The dispersants of the presently claimed invention can be used in broad application fields, such as coatings, inks and electronic materials. These dispersants can be used in solvent based systems such as organic and inorganic pigments dispersion, e.g. in alkyd, CAB (cellulose acetate butyrate), UV (Ultraviolet) and TPA (thermoplastic acrylate) paint systems, industrial coatings as well as in printing inks and graphic arts.

The composition comprises fine particulate solid materials and a liquid diluent.

The fine particulate solid materials include, but are not limited, to pigments and fillers. The pigments can be inorganic or organic.

In a preferred embodiment, the size of the solid particulate material represented as the weight average particle diameter is in the range from 1 nm to 20000 nm; more preferably form 10 nm to 10000 nm; and most preferably from 20 nm to 500 nm. The weight average particle diameter may be determined by sieving analysis or by light scattering methods.

In a particularly preferred embodiment, the pigment is carbon black and the weight average particle diameter of the pigment is in the range from 100 nm to 300 nm.

In a preferred embodiment, the organic pigments are pigments and pearlescent flakes selected from the group consisting of azo, disazo, naphthol, benzimidazolone, azo-condensation, metal complex, isoindolinone, and isoindoline pigments, the chinophthalon pigment, dioxazine pigment and the polycyclic pigment group consisting of indigo, thioindigo, quinacridones, phthalocyanines, perylenes, perionones, anthraquinones, such as aminoanthraquinones or hydroxyanthraquinones, anthrapyrimidines, indanthrones, flavanthrones, pyranthrones, anthantrones, isoviolanthrones, diketopyrrolopyrrole, and carbazoles, e.g. carbazole violet, and the like. Further examples of organic pigments can be found in the monograph: W. Herbst, K. Hunger "*Industrielle Organische Pigmente*" $2^{nd}$ Edition, 1995, VCH Verlagsgesellschaft, ISBN: 3-527-28744-2.

In a preferred embodiment, the inorganic pigments are selected from the group consisting of metallic flakes, such as aluminium, aluminium oxide, calcium carbonate, silicon oxide and silicates, iron(III)oxide, chromium(III)oxide, titanium(IV)oxide, zirconium(IV)oxide, zinc oxide, zinc sulphide, zinc phosphate, mixed metal oxide phosphates, molybdenum sulphide, cadmium sulphide, carbon black or graphite, vanadates, such as bismuth vanadate, chromates, such as lead(IV)chromate, and molybdates, such as lead(IV) molybdate, and mixtures, crystal forms or modifications thereof, such as rutile, anatase, mica, talcum, kaolin, and mixtures thereof.

In a preferred embodiment, the fillers are selected from the group consisting of calcium carbonate, silicates, glass fibers, glass beads, talc, kaolin, mica, barium sulphate, metal oxides and hydroxides, carbon black, graphite, wood powders, powders and fibers of other natural products, synthetic fibers and mixtures thereof.

The liquid diluent present in the dispersion will depend on the field of application.

For water-based formulations, the liquid diluent comprises water and may further comprise polar, water-miscible solvents such as $C_1$-$C_4$alkanols, e.g. methanol, ethanol, isopropanol, propanol or n-butanol, glycol ethers like butyl glycol, or methoxypropylene glycol, polyols, e.g. glycerol, ethyleneglycol, diethyleneglycol, triethylene, triethylene glycol or propylene glycol.

For solvent based formulations, the liquid diluent is selected from low polarity solvents such as aliphatic hydrocarbons, esters like butyl acetate, or glycol ethers like methoxypropylene glycol and glycol ether esters like methoxypropylene glycol acetate and mixtures thereof.

In a preferred embodiment, the weight ratio of the fine particulate solid materials to the liquid diluent is in the range from 100:1 to 1:50; and more preferably in the range from 30:1 to 1:10.

The dispersion further comprises a binder and/or one or more additives depending on the intended use. The additive includes but are not limited to plasticizers, lubricants, emulsifiers, humectants, rheology additives, catalysts, flow auxiliaries, optical brighteners, flame retardants, preservatives, antistatic agents and blowing agents.

In a preferred embodiment, the dispersion is in the form of a mill base. The millbase comprises the fine particulate solid materials, the dispersant of formula (I), the liquid diluent and optionally additives, but generally mill base will not contain binders.

In a preferred embodiment, the dispersion is in the form of a coating composition. The coating composition comprises the fine particulate solid materials, the dispersant of formula (I), the liquid diluent and additionally at least one binder, e.g. film-forming polymers or prepolymers which form a film upon curing. The coating composition further comprise additives conventionally used in coating technology, e.g. plasticizers, lubricants, emulsifiers, rheology additives, catalysts, flow auxiliaries, optical brighteners, flame retardants, preservatives, antistatic agents or blowing agents.

In a preferred embodiment, the dispersion is in the form of an ink composition, e.g. a printing ink or a gravure ink. The ink composition comprises the fine particulate solid materials, the dispersant of formula (I), the liquid diluent and additionally at least one binder conventionally used in ink technology, e.g. film-forming polymers or prepolymers which form a film upon curing.

The presently claimed invention offers one or more of the following advantages:
1) The dispersants of the presently claimed invention provide stable dispersions with a high pigment loading.
2) Dispersions containing the dispersants of the presently claimed invention have a low viscosity. The viscosity of the dispersions is significantly reduced even at a high pigment loading.
3) The dispersants of the presently claimed invention enhance the rheology behavior of dispersions. Further, their rheology behavior does not change with time.
4) Surfaces coated with coating compositions comprising the dispersants of the presently claimed invention display a high gloss and a reduced crater number.

In the following, there is provided a list of embodiments to further illustrate the present disclosure without intending to limit the disclosure to the specific embodiments listed below.

1. A dispersant of formula (I),

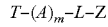   formula (I), wherein T is hydrogen or $R^1$—C(=O)—,
$R^1$ is a substituted or unsubstituted, linear or branched $C_1$-$C_{24}$ alkyl;
A is, identical or different, an oxyalkylenecarbonyl unit of formula —O—$R^2$—C(=O)—,
$R^2$ is a substituted or unsubstituted, linear or branched $C_2$-$C_{12}$ alkylene;
m is an integer in the range from 3 to 50;
L represents a group selected from the group consisting of —O— and —NH—;
Z is a nitrogen containing group selected from the group consisting of $Z_1$, $Z_2$, and $Z_3$; wherein $Z_1$ is $R^{11}R^{12}N$—$R^{13}$—, $Z_2$ is Y—$R^{14}$—, and $Z_3$ is Y—$CH_2$—$CH_2$—C(=O)—$OR^{14}$—
$R^{11}$ and $R^{12}$ are independently selected from hydrogen and substituted or unsubstituted, linear or branched $C_1$-$C_{12}$ alkyl which can be the same or different, or $R^{11}$ and $R^{12}$ together with the nitrogen to which they are attached form a 3- to 12-membered ring comprising 0 to 3 heteroatoms,
$R^{13}$ is a substituted or unsubstituted, linear or branched $C_1$-$C_{12}$ alkylene;

Y is a 5- or 6-membered N-containing heterocycle which comprises 1 or 2 nitrogen atoms and which can additionally comprise an oxygen atom,
$R^{14}$ is a substituted or unsubstituted, linear or branched $C_1$-$C_{12}$ alkylene;
or Z is a quaternary ammonium salt derivable from the nitrogen containing group selected from the group consisting of $Z_1$, $Z_2$, and $Z_3$; wherein the quaternary nitrogen is attached to $R^{15}$ and an anion $X^-$,
$R^{15}$ is selected from the group consisting of hydrogen, a substituted or unsubstituted, linear or branched $C_1$-$C_{24}$ alkyl, a substituted or unsubstituted $C_4$-$C_{10}$ cycloalkyl, a substituted or unsubstituted $C_6$-$C_{18}$ aryl, and substituted or unsubstituted, branched or unbranched $C_7$-$C_{18}$ arylalkyl; wherein the $C_1$-$C_{24}$ alkyl is optionally interrupted by —O— and/or is optionally substituted by a group selected from —OH and —O—$C_1$-$C_{10}$alkyl; and
$X^-$ is selected from the group consisting of Cl, Br, I, acetate and benzoate.

2. The dispersant according to embodiment 1, wherein T is hydrogen or $R^1$—C(=O)—, wherein $R^1$ selected from the group consisting of $CH_3$—, $C_2H_5$—, $CH_3CH(OH)$—, $OHCH_2$—, $CH_3OCH_2$—, $CH_3(CH_2)_2$—, $CH_3(CH_2)_3$—, $CH_3(CH_2)_{10}$—, and $CH_3(CH_2)_{16}$—.

3. The dispersant according to embodiments 1 or 2, wherein m is an integer in the range from 2 to 20.

4. The dispersant according to any of embodiments 1 to 3, wherein $R^2$ is —$(CH_2)_5$—, —$(CH_2)_4$— or —$(CH_2)_3$—.

5. The dispersant according to any of embodiments 1 to 4, wherein $(A)_m$ is $(A^1)_{M1}(A^2)_{M2}$, wherein $A^1$ and $A^2$ are different from each other and selected from the group consisting of —O—$(CH_2)_5$—C(=O)—, —O—$(CH_2)_4$—C(=O)— and —O—$(CH_2)_3$—C(=O)—; and M1 and M2 are, identical or different, an integer in the range from 1 to 40, and the ratio of M1 and M2 is in the range from 10:1 to 1:10.

6. The dispersant according to any of embodiments 1 to 5, wherein $(A)_m$ is (—O—$(CH_2)_5$—C(=O)—)$_{M1}$(—O—$(CH_2)_4$—C(=O)—)$_{M2}$, wherein M1 and M2 are, identical or different, an integer in the range from 1 to 40, and the ratio of M1 and M2 is in the range from 10:1 to 1:10.

7. The dispersant according to any of embodiments 1 to 6, wherein $R^{11}$ and $R^{12}$ are unsubstituted, linear or branched $C_1$-$C_8$ alkyl, and $R^{13}$ is unsubstituted, linear or branched $C_1$-$C_8$ alkylene.

8. The dispersant according to any of embodiments 1 to 7, wherein $R^{11}$ is methyl, $R^{12}$ is methyl and $R^{13}$ is —$CH_2CH_2CH_2$—.

9. The dispersant according to any of embodiments 1 to 8, wherein Y is selected from the group consisting of imidazolyl, morpholinyl and piperidinyl.

10. The dispersant according to any of embodiments 1 to 9, wherein $R^{14}$ is selected from the group consisting of —$CH_2$—, —$CH_2CH_2$—, —$CH_2CH_2CH_2$— and —$CH_2CH_2CH_2CH_2$—.

11. The dispersant according to any of embodiments 1 to 10, wherein $R^{15}$ is selected from the group consisting of —$CH_2CH(OH)CH_2$—O—$CH_2CH(C_2H_5)$ $CH_2CH_2CH_2CH_3$, —$CH_2$-phenyl and —$CH_2CH_2CH_2$-phenyl, wherein phenyl is unsubstituted or substituted by 1, 2 or 3 substituents selected from the group consisting of chloride, bromide, hydroxy, $NO_2$ and methoxy.

12. The dispersant according to any of embodiments 1 to 11, wherein Z is a nitrogen containing group selected from the group consisting of $Z_1$, $Z_2$, and $Z_3$ and the dispersant has an amine number from 10 to 200 mg KOH/g, as determined according to DIN 53176:2002-11.

13. The dispersant according to any of embodiments 1 to 11, wherein Z is a quaternary ammonium salt and the dispersant has an amine number from 1 to 20 mg KOH/g, as determined according to DIN 53176:2002-11.

14. A process for preparing a dispersant according to any of embodiments 1 to 13 comprising
    i. mixing a compound of formula $R^{11}R^{12}N—R^{13}—NH_2$ with a lactone monomer of formula (II),

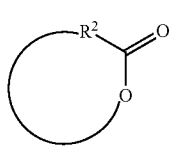

formula (II)

or a polyester homopolymer or copolymer obtainable from the lactone monomer of formula (II) to obtain a reaction mixture, wherein $R^2$, $R^{11}$, $R^{12}$ and $R^{13}$ are as defined as in any of claims 1 to 13;
    ii. heating the reaction mixture as obtained in step i. at a temperature in the range of 70 to 150° C. to obtain a homogeneous mixture; and
    iii. heating the homogeneous mixture as obtained in step ii. at a temperature in the range of 100 to 300° C. to obtain the dispersant of formula (I).

15. The process according to embodiment 14, wherein the lactone monomer of formula (II) is selected from the group consisting of ε-caprolactone, γ-valerolactone, γ-butyrolactone, wherein the lactone monomer is unsubstituted or substituted by 1, 2 or 3 substituents selected from the group consisting of methyl, hydroxy and methoxy.

16. The process according to embodiment 14, wherein the compound of formula $R^{11}R^{12}N—R^{13}—NH_2$ is selected from the group consisting of 3-(dimethylamino)-1-propylamine, 1-(3-aminopropyl)midazole, N-(2-aminoethyl)morpholine, N-(2-aminoethyl)-piperidine, and 4-aminomethyl-piperidine.

17. A process for preparing the dispersant according to any of embodiments 1 to 13 comprising
    a. heating a hydroxyalkyl acrylate of formula $CH_2=CH—C(=O)—O—R^{14}—OH$ with a 5- or 6-membered N-containing heterocycle of formula YH at a temperature in the range of 30 to 100° C. to obtain a resultant mixture, wherein Y and $R^{14}$ is defined as in any of claims 1 to 13; and
    b. adding the lactone monomer of formula (II)

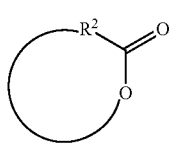

formula (II)

wherein $R^2$ is defined as in any of claims 1 to 13, or a polyester homopolymer or copolymer obtainable from the lactone monomer of formula (II) to the resultant mixture as obtained in step a. to obtain a reaction mixture;

c. heating the reaction mixture as obtained in step b. at a temperature in the range of 70 to 150° C. to obtain a homogeneous mixture; and
d. heating the homogeneous mixture as obtained in step c. at a temperature in the range of 100 to 300° C. to obtain the dispersant of formula (I).

18. The process according to embodiment 17, wherein the N-containing heterocycle of formula YH is selected from the group consisting of imidazole, morpholine and piperidine.

19. The process according to any of embodiments 14 to 18, wherein the polyester homopolymer or copolymer is obtained by heating a mixture comprising a carboxylic acid of formula $R^1—C(=O)—OH$, wherein $R^1$ is defined as in any of claims 1 to 13, and the lactone monomer of formula (II) in the presence of a catalyst at a temperature in the range of 50 to 150° C.

20. The process according to embodiment 19, wherein $R^1—C(=O—)OH$ is lauric acid, and the catalyst is dibutyltin dilaurate.

21. The process according to any of embodiments 14 to 20 further comprising a step of quaternizing the dispersant obtained in step (iii) or step (d) by heating a mixture comprising the dispersant and an alkylating agent at a temperature in the range of 50 to 150° C.

22. The process according to embodiment 21, wherein the alkylating agent is selected from the group consisting of an alkyl halide of formula $R^{15}X$ and an epoxide of formula (III),

formula (III)

wherein $R^{15}$ is defined as in any of claims 1 to 13 and $R^{16}$ is a substituted or unsubstituted, linear or branched $C_1$-$C_{24}$ alkyl, a substituted or unsubstituted $C_4$-$C_{10}$ cycloalkyl, a substituted or unsubstituted $C_6$-$C_{18}$ aryl, and substituted or unsubstituted, branched or unbranched $C_7$-$C_{18}$ arylalkyl; wherein the $C_1$-$C_{24}$ alkyl is optionally interrupted by —O— and/or is optionally substituted by a group selected from —OH and —O—$C_1$-$C_{10}$alkyl.

23. The process according to embodiment 22, wherein the alkyl halide of formula $R^{15}X$ is selected from the group consisting of 2-chlorobenzylchloride, and 1-bromo-3-phenylpropane.

24. The process according to embodiment 21, wherein the epoxide of formula (III) is selected from the group consisting of 2-ethylhexyl glycidyl ether, dodecyl glycidyl ether, tetradecyl glycidyl ether and 1,2-epoxydodecan.

25. A liquid composition in the form of a dispersion comprising the dispersant according to any of embodiments 1 to 13, a particulate solid material selected from the group consisting of pigments and fillers, and a liquid diluent.

26. Use of the dispersant according to any of embodiments 1 to 13 as a component of a coating composition or an ink composition.

While the presently claimed invention has been described in terms of its specific embodiments, certain modifications and equivalents will be apparent to those skilled in the art and are intended to be included within the scope of the presently claimed invention.

EXAMPLES

The presently claimed invention is illustrated in detail by non-restrictive working examples which follow. More particularly, the test methods specified hereinafter are part of the general disclosure of the application and are not restricted to the specific working examples.

Materials

| | |
|---|---|
| CAB-531 | Cellulose acetate butyrate material commercially is available from Eastman Chemical. |
| Uracron ™ CR 226 XB-50 | Thermosetting hydroxy acrylic resin is available from DSM Coating. |
| Uramex ™ MF 821 | Non-plasticized n-butylated melamine formaldehyde resin is available from DSM Coating. |

Methods

Acid number: The acid number was determined according to DIN 53402:1990-09.

Amine number: The amine number was determined according to DIN 53176:2002-11.

Solid content: The solid content was determined via moisture analyzer (HE73, Mettler Toledo, ~0.5 g, 10 min@175° C.).

Viscosity: The viscosity was determined by analogy to DIN 53019-1:2008-09, using a Thermo-Haake RheoStress 600 equipment under the CR mode at 22° C. and a shear rate of 1 sec$^{-1}$ (Spindle CP50).

Gloss: The gloss of the obtained coatings at 20° angle was determined according to DIN 67530/DIN EN ISO 2813:2012-10 using a commercial reflectometer (Micro-Tri-Gloss reflectometer from BYK Gardner).

A) Preparation of the Dispersants

Comparative Example A: (Non-Amine end Capped Dispersant)

A mixture of 10 g lauric acid, 40 g ε-caprolactone and 0.05 g dibutyltin dilaurate (DBTL) was stirred at 100° C. until a homogenous mixture was obtained. Then, the mixture was heated and stirred at 180° C. under nitrogen gas until the solid content was 97%. A yellowish solid dispersant with an acid number of 55 mg KOH/g was obtained.

Preparation of Dispersants of the Presently Claimed Invention

Example 1: Preparation of Dispersant 1

A mixture of 10.2 g 3-(dimethylamino)-1-propylamine and 57 g ε-caprolactone was stirred at 100° C. until a homogenous mixture was obtained. Then, the mixture was heated and stirred at 180° C. under nitrogen gas until the solid content was 97%. A yellowish solid dispersant with an amine number of 80 mg KOH/g was obtained.

Example 2: Preparation of Dispersant 2

A mixture of 10.2 g 3-(dimethylamino)-1-propylamine and 114 g ε-caprolactone was stirred at 100° C. until a homogenous mixture was obtained. Then, the mixture was heated and stirred at 180° C. under nitrogen gas until the solid content was 97%. A yellowish solid dispersant with an amine number of 43 mg KOH/g was obtained.

Example 3: Preparation of Dispersant 3

A mixture of 12.5 g 1-(3-aminopropypimidazole and 57 g ε-caprolactone was stirred at 100° C. until a homogenous mixture was obtained. Then, the mixture was heated and stirred at 180° C. under nitrogen gas until the solid content was 97%. A yellowish solid dispersant with an amine number of 75 mg KOH/g was obtained.

Example 4: Preparation of Dispersant 4

A mixture of 12.5 g 1-(3-aminopropyl)imidazole and 114 g ε-caprolactone was stirred at 100° C. until a homogenous mixture was obtained. Then, the mixture was heated and stirred at 180° C. under nitrogen gas until the solid content was 97%. A yellowish solid dispersant with an amine number of 42 mg KOH/g was obtained.

Example 5: Preparation of Dispersant 5

A mixture of 12.5 g 1-(3-aminopropyl)imidazole, 57 g ε-caprolactone and 30 g γ-valerolactone was stirred at 100° C. until a homogenous mixture was obtained. Then, the mixture was heated and stirred at 180° C. under nitrogen gas until the solid content was 97%. A yellowish liquid dispersant with an amine number of 55 mg KOH/g was obtained.

Example 6: Preparation of Dispersant 6

11.6 g 2-Hydroxyethyl acrylate was stirred in the reactor at room temperature, and 6.8 g imidazole solid was slowly added. The mixture was stirred at 50° C. for 3 hours. Then, 57 g ε-caprolactone and 30 g γ-valerolactone were added and stirred at 100° C. until a homogenous mixture was obtained. The mixture was heated and stirred at 180° C. under nitrogen gas until the solid content was 97%. A yellowish liquid dispersant with an amine number of 51 mg KOH/g was obtained.

Example 7: Preparation of Dispersant 7

A mixture of 14.4 g N-(3-aminopropyl)morpholine and 114 g ε-caprolactone was stirred at 100° C. until a homogenous mixture was obtained. Then, the mixture was heated and stirred at 180° C. under nitrogen gas until the solid content was 97%. A yellowish solid dispersant with an amine number of 40 mg KOH/g was obtained.

Example 8: Preparation of Dispersant 8

A mixture of 12.8 g N-(2-aminoethyl)-piperidine, 57 g ε-caprolactone and 30 g γ-valerolactone was stirred at 100° C. until a homogenous mixture was obtained. Then, the mixture was heated and stirred at 180° C. under nitrogen gas until the solid content was 97%. A yellowish liquid dispersant with an amine number of 54 mg KOH/g was obtained.

Example 9: Preparation of Dispersant 9

A mixture of 10.8 g 4-(aminomethyl)pyridine, 57 g ε-caprolactone and 30 g γ-valerolactone was stirred at 100°

C. until a homogenous mixture was obtained. Then, the mixture was heated and stirred at 180° C. under nitrogen gas until the solid content was 97%. A yellowish liquid dispersant with an amine number of 58 mg KOH/g was obtained.

Example 10: Preparation of Dispersant 10

A mixture of 10 g lauric acid, 40 g ε-caprolactone and 0.05 g dibutyltin dilaurate (DBTL) was stirred at 100° C. until a homogenous mixture was obtained. Then, the mixture was heated and stirred at 180° C. under nitrogen gas until the solid content was 97%. 5.1 g 3-(Dimethylamino)-1-propylamine was added, and stirred at 180° C. under nitrogen gas until the amine number was 50 mg KOH/g. A yellowish solid dispersant was obtained.

Example 11: Preparation of Dispersant 11

A mixture of 10 g lauric acid, 40 g ε-caprolactone and 0.05 g dibutyltin dilaurate (DBTL) was stirred at 100° C. until a homogenous mixture was obtained. Then, the mixture was heated and stirred at 180° C. under nitrogen gas until the solid content was 97%. 6.3 g 1-(3-Aminopropyl)imidazole was added, and stirred at 180° C. under nitrogen gas until the amine number 50 mg KOH/g. A yellowish solid dispersant was obtained.

Example 12: Preparation of Dispersant 12

A mixture of 70 g Dispersant 1 (obtained in Example 1), 18.6 g 2-ethylhexyl glycidyl ether and 12.2 g benzoic acid was stirred at 120° C. until the amine number less than 10 mgKOH/g. A yellowish solid dispersant was obtained.

Example 13: Preparation of Dispersant 13

A mixture of 75 g Dispersant 3 (obtained in Example 3), and 16 g 2-chlorobenzylchloride was stirred at 100° C. until the amine number less than 10 mgKOH/g. A yellowish solid dispersant was obtained.

Example 14: Preparation of Dispersant 14

A mixture of 75 g Dispersant 3 (obtained in Example 3), 18.6 g 2-ethylhexyl glycidyl ether and 12.2 g benzoic acid was stirred at 120° C. until the amine number was less than 10 mgKOH/g. A yellowish solid dispersant was obtained.

Example 15: Preparation of Dispersant 15

A mixture of 102 g Dispersant 5 (obtained in Example 5) and 16 g 2-chlorobenzylchloride was stirred at 100° C. until the amine number was less than 5 mg KOH/g. A yellowish liquid dispersant was obtained.

Example 16: Preparation of Dispersant 16

A mixture of 97 g Dispersant 9 (obtained in Example 9) and 20 g 1-bromo-3-phenylpropane was stirred at 100° C. until the amine number was less than 5 mg KOH/g. A yellowish liquid dispersant was obtained.

B) Performance Testing

Preparation of a Paint Composition for Testing

Step 1: Preparation of millbase or pigment concentrate

The dispersion effect of the dispersants of the presently claimed invention was evaluated by preparing resin free millbase according to the Formulation 1.

For comparison, a resin free millbase was prepared from the dispersant prepared according to comparative example A and the dispersants according to the presently claimed invention.

Formulation 1: Preparation of Millbase

| No. | Component | Amount |
| --- | --- | --- |
| 1) | Dispersant (100% solid) | 3.7 g |
| 2) | Methoxypropylacetate (MPA) solvent | 26.4 g |
| 3) | Pigment: Carbon Black FW 200 | 4.9 g |
| 4) | 2.0 mm glass beads | 35 g |
|  | Total | 70 g |

The milling step was carried out in a Scandex Shaker with the help of glass beads for 4 hours to obtain a dispersion or millbase. The dispersion was filtered and stored at room temperature overnight.

The viscosity of the millbase was determined and the results are summarized in Table 1.

TABLE 1

| Millbase viscosity (Viscosity @ 1 $S^{-1}$) | |
| --- | --- |
| Dispersant | MPa · s |
| Comparative example A | 90500 |
| Dispersant 2 | 8550 |
| Dispersant 3 | 16500 |
| Dispersant 5 | 10500 |
| Dispersant 6 | 5500 |
| Dispersant 15 | 3500 |

It is evident from Table 1 that the millbase prepared using the dispersants of the presently claimed invention have a low millbase viscosity. On the contrary, the millbase prepared using the comparative dispersant has a very high viscosity.

Step 2) Preparation of a Paint Composition

A paint composition was prepared by dispersing 2.0 g millbase into 8.0 g let-down system according to Formulation 2 via Dispermat® for 2 min at 2000 rpm.

Formulation 2: Let-Down System

| CAB base coat | CAB 531-1 | 11.2 |
| --- | --- | --- |
|  | Butyl acetate | 51.9 |
|  | Uracron ™ CR 226 XB 50 | 32.1 |

-continued

| | |
|---|---|
| Uramex ™ MF 821 | 4.8 |
| Total | 100.0 |

Application Example

The paint composition was applied as a polyester film with a 75 μm film thickness. The results are summarized in Table 2.

TABLE 2

Gloss (20°) and crater ranking

| Dispersant | Gloss | Crater* |
|---|---|---|
| Comparative example A | 60 | 3 |
| Dispersant 2 | 68 | 1 |
| Dispersant 3 | 67 | 1 |
| Dispersant 5 | 71 | 1 |
| Dispersant 6 | 70 | 1 |
| Dispersant 15 | 68 | 2 |

*1 means no crater and 5 means many craters

It is evident from Table 2 that the performance of the paints prepared using the dispersants of the presently claimed invention was very good with satisfactory results such as high gloss and low craters, as compared to that of the dispersant from comparative example 1.

The invention claimed is:

1. A dispersant of formula (I),

T-(A)$_m$-L-Z  formula (I), wherein T is hydrogen or $R^1$—C(=O)—,
$R^1$ is a substituted or unsubstituted, linear or branched $C_1$-$C_{24}$ alkyl;
wherein (A)$_m$ is (A$^1$)$_{M1}$ (A$^2$)$_{M2}$, wherein A$^1$ and A$^2$ are different from each other and selected from the group consisting of —O—(CH$_2$)$_5$—C(=O)—, —O—(CH$_2$)$_4$—C(=O)— and —O—(CH$_2$)$_3$—C(=O)—; and M1 and M2 are, identical or different, an integer in the range from 1 to 40, and the ratio of M1 and M2 is in the range from 10:1 to 1:10;
L represents a group selected from the group consisting of —O— and —NH—;
Z is a nitrogen containing group selected from the group consisting of $Z_1$, $Z_2$, and $Z_3$ and the dispersant has an amine number from 10 to 200 mg KOH/g, as determined according to DIN 53176:2002-11;
wherein $Z_1$ is $R^{11}R^{12}N$—$R^{13}$—, $Z_2$ is Y—$R^{14}$—, and $Z_3$ is Y—CH$_2$—CH$_2$—C(=O)—OR$^{14}$—
$R^{11}$ and $R^{12}$ are independently selected from hydrogen and substituted or unsubstituted, linear or branched $C_1$-$C_{12}$ alkyl which can be the same or different, or $R^{11}$ and $R^{12}$ together with the nitrogen to which they are attached form a 3- to 12-membered ring comprising 0 to 3 heteroatoms,
$R^{13}$ is a substituted or unsubstituted, linear or branched $C_1$-$C_{12}$ alkylene;
Y is a 5- or 6-membered N-containing heterocycle which comprises 1 or 2 nitrogen atoms and which can additionally comprise an oxygen atom,
$R^{14}$ is a substituted or unsubstituted, linear or branched $C_1$-$C_{12}$ alkylene;
or Z is a quaternary ammonium salt derivable from the nitrogen containing group selected from the group consisting of $Z_1$, $Z_2$, and $Z_3$ and the dispersant has an amine number from 1 to 20 mg KOH/g, as determined according to DIN 53176:2002-11; wherein the quaternary nitrogen is attached to $R^{15}$ and an anion X—,
$R^{15}$ is selected from the group consisting of hydrogen, a substituted or unsubstituted, linear or branched $C_1$-$C_{24}$ alkyl, a substituted or unsubstituted $C_4$-$C_{10}$ cycloalkyl, a substituted or unsubstituted $C_6$-$C_{18}$ aryl, and substituted or unsubstituted, branched or unbranched $C_7$-$C_{18}$ arylalkyl; wherein the $C_1$-$C_{24}$ alkyl is optionally interrupted by —O— and/or is optionally substituted by a group selected from —OH and —O—$C_1$-$C_{10}$alkyl; and
X$^-$ is selected from the group consisting of Cl, Br, I, acetate and benzoate.

2. The dispersant according to claim 1, wherein $R^1$ selected from the group consisting of CH$_3$ (CH$_2$)$_3$—, CH$_3$ (CH$_2$)$_{10}$—, and CH$_3$ (CH$_2$)$_{16}$—.

3. The dispersant according to claim 1, wherein m is an integer in the range from 3 to 20.

4. The dispersant according to claim 1, wherein (A)$_m$ is (—O—(CH$_2$)$_5$—C(=O)—)$_{M1}$ (—O—(CH$_2$)$_4$—C(=O)—)$_{M2}$, wherein M1 and M2 are, identical or different, an integer in the range from 1 to 40, and the ratio of M1 and M2 is in the range from 10:1 to 1:10.

5. The dispersant according to claim 1, wherein $R^{11}$ and $R^{12}$ are independently unsubstituted, linear or branched $C_1$-$C_8$ alkyl, and $R^{13}$ is unsubstituted, linear or branched $C_1$-$C_8$ alkylene.

6. The dispersant according to claim 1, wherein $R^{11}$ is methyl, $R^{12}$ is methyl and $R^{13}$ is —CH$_2$CH$_2$CH$_2$—.

7. The dispersant according to claim 1, wherein Y is selected from the group consisting of imidazolyl, morpholinyl and piperidinyl.

8. The dispersant according to claim 1, wherein $R^{14}$ is selected from the group consisting of —CH$_2$—, —CH$_2$CH$_2$—, —CH$_2$CH$_2$CH$_2$— and —CH$_2$CH$_2$CH$_2$CH$_2$—.

9. The dispersant according to claim 1, wherein $R^{15}$ is selected from the group consisting of —CH$_2$CH(OH) CH$_2$—O—CH$_2$CH(C$_2$H$_5$) CH$_2$CH$_2$CH$_2$CH$_3$, —CH$_2$-phenyl and —CH$_2$CH$_2$CH$_2$-phenyl, wherein phenyl is unsubstituted or substituted by 1, 2 or 3 substituents selected from the group consisting of chloride, bromide, hydroxy, NO$_2$ and methoxy.

10. A process for preparing a dispersant according to claim 1 comprising
   i. mixing a compound of formula $R^{11}R^{12}N$—$R^{13}$—NH$_2$ with a lactone monomer of formula (II),

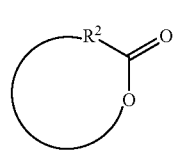

formula (II)

or a polyester homopolymer or copolymer obtainable from the lactone monomer of formula (II) to obtain a reaction mixture, wherein $R^2$, $R^{11}$, $R^{12}$ and $R^{13}$ are as defined as in claim 1;
   ii. heating the reaction mixture as obtained in step i. at a temperature in the range of 70 to 150° C. to obtain a homogeneous mixture; and
   iii. heating the homogeneous mixture as obtained in step ii. at a temperature in the range of 100 to 300° C. to obtain the dispersant of formula (I).

11. A process for preparing the dispersant according to claim 1 comprising
   a. heating a hydroxyalkyl acrylate of formula $CH_2=CH-C(=O)-O-R^{14}-OH$ with a 5- or 6-membered N-containing heterocycle of formula YH at a temperature in the range of 30 to 100° C. to obtain a resultant mixture, wherein Y and $R^{14}$ is defined as in claim 1; and
   b. adding the lactone monomer of formula (II)

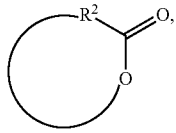

formula (II)

wherein $R^2$ is defined as in claim 1,
or a polyester homopolymer or copolymer obtainable from the lactone monomer of formula (II) to the resultant mixture as obtained in step a. to obtain a reaction mixture;

c. heating the reaction mixture as obtained in step b. at a temperature in the range of 70 to 150° C. to obtain a homogeneous mixture; and
   d. heating the homogeneous mixture as obtained in step c. at a temperature in the range of 100 to 300° C. to obtain the dispersant of formula (I).

12. The process according to claim 10 further comprising a step of quaternizing the dispersant obtained in step (iii) or step (d) by heating a mixture comprising the dispersant and an alkylating agent at a temperature in the range of 50 to 150° C.

13. A liquid composition in the form of a dispersion comprising the dispersant according to claim 1, a particulate solid material selected from the group consisting of pigments and fillers, and a liquid diluent.

14. A method comprising utilizing the dispersant according to claim 1 as a component of a coating composition or an ink composition.

* * * * *